United States Patent
Graf et al.

(10) Patent No.: US 7,496,783 B1
(45) Date of Patent: Feb. 24, 2009

(54) MERGING CLUSTER NODES DURING A RESTORE

(75) Inventors: Nicholas R. Graf, Austin, TX (US); Thomas R. Ketterhagen, Georgetown, TX (US)

(73) Assignee: Symantec Operating Corporation, Mountain View, CA (US)

( * ) Notice: Subject to any disclaimer, the term of this patent is extended or adjusted under 35 U.S.C. 154(b) by 480 days.

(21) Appl. No.: 11/352,195

(22) Filed: Feb. 9, 2006

(51) Int. Cl.
 *G06F 11/00* (2006.01)
(52) U.S. Cl. .............................. 714/4; 714/13
(58) Field of Classification Search .............. 714/4, 714/13, 15; 707/202, 204; 709/223, 226
See application file for complete search history.

(56) References Cited

U.S. PATENT DOCUMENTS

| | | | |
|---|---|---|---|
| 6,038,677 A * | 3/2000 | Lawlor et al. ................. | 714/4 |
| 6,453,426 B1 * | 9/2002 | Gamache et al. .............. | 714/4 |
| 6,535,998 B1 | 3/2003 | Cabrera et al. | |
| 6,714,980 B1 * | 3/2004 | Markson et al. ............. | 709/226 |
| 6,820,214 B1 | 11/2004 | Cabrera et al. | |
| 6,944,788 B2 * | 9/2005 | Dinker et al. ................. | 714/4 |
| 7,234,075 B2 * | 6/2007 | Sankaran et al. ............. | 714/13 |
| 7,320,088 B1 * | 1/2008 | Gawali et al. ................. | 714/6 |
| 7,334,157 B1 | 2/2008 | Graf et al. | |
| 2003/0055967 A1 * | 3/2003 | Worley ....................... | 709/226 |
| 2005/0125460 A1 | 6/2005 | Yu et al. | |
| 2007/0234342 A1 * | 10/2007 | Flynn et al. ................. | 717/174 |

OTHER PUBLICATIONS

"Server Clusters: Backup and Recovery Best Practices for Windows Server 2003." Microsoft Corp. Jan. 1, 2003. retrieved Jul. 29, 2008 from "http://www.microsoft.com/technet/prodtechnol/windowsserver2003/technologies/clustering/sercbrbp.mspx".*
"Backing up and restoring server clusters." Microsoft Corp. Jan. 21, 2005. retrieved Jul. 29, 2008 from "http://technet2.microsoft.com/windowsserver/en/library/c9fe11a9-97c0-496a-9223-ed4b777863681033.mspx".*
"Automated System Recovery with VERITAS Netbackup," VERITAS Bare Metal Rstore, White Paper, VERITAS Software Corp., 2002, pp. 1-10.
Sarah O'Donnell, "Novell OES: Consistent Data Protection and DR During—And After—The Migration Project," Novell BrainShare Barcelona, Oct. 3, 2005, 36 pages.

(Continued)

*Primary Examiner*—Robert Beausoliel
*Assistant Examiner*—Philip Guyton
(74) *Attorney, Agent, or Firm*—Lawrence J. Merkel; Meyertons, Hood, Kivlin, Kowert & Goetzel, P.C.

(57) ABSTRACT

In one embodiment, a backup/restore mechanism is contemplated which may be used to consolidate application servers from a cluster to a single node and/or to restore a clustered environment. The mechanism may automatically consolidate shared resources on a node during a restore, even if the resources were external to the nodes in the cluster (e.g. on a shared storage device). Thus, complex and error prone manual intervention may be avoided, in some embodiments. In some embodiments, the backup mechanism may include checking identifiers for each node and application server in a cluster server data base, to identify node backups as opposed to application server backups. Local node resources may be associated with the node backups, and shared resources may be associated with the application server backups.

27 Claims, 7 Drawing Sheets

OTHER PUBLICATIONS

Anindya Mukherjee, "Migrate and Consolidate by Leveraging Linux Lower Costs," LinuxWorld Magazine, 6 pages, Oct. 16, 2006.

"Magnitude and Microsoft: Simplified Consolidation and Clustering," Xiotech Corporation, Solution Brief, 2 pages, 2004.

Matt Bush, et al., "Oracle Database 10g Standard Edition One to Oracle Database 10g Standard Edition with Real Application Clusters Migration using the Dell Server Platform," Dell Database Solutions, 26 pages, Aug. 8, 2005.

Wolter Wolters, "Backup Express Cluster Support for Windows," Syncsort Incorporated, 20 pages, 2002.

SQLServer Standard, A Technical Journal for the SQLServerCentral. com and PASS Communities, Sep./Oct. 2005 Issue, 36 pages.

"Restoring or Retrieving Files from Another Client Node," Storage Manager for NetWare, Version 5.3, Tivoli, 1 page, printed from website on Jan. 19, 2006.

Office Action from U.S. Appl. No. 10/789,901 mailed Mar. 11, 2008.

http://www.melbpc.org.au/pcupdate/2003/2003article8.htm Reprinted from the Mar. 2000 issue of PC Update, the magazine of Melborne PC User Group, Australia, 2003, 4 pages.

\* cited by examiner

MERGING CLUSTER NODES DURING A RESTORE

BACKGROUND

1. Field of the Invention

This invention is related to backup and restore of computer data in a cluster of computer systems.

2. Description of the Related Art

In many computer applications, high availability is a priority. For example, application servers provide service to clients over a network, such as a local area network (LAN), wide area network (WAN), the Internet, etc. Having the application servers available at all times (or as close to all times as practical) may be critical to the client's needs. If the application server belongs to a business and the clients are customers of the business, the business may lose sales of the application server is not available.

One mechanism for providing high availability is to cluster two or more computers using cluster server software. For example, the VERITAS Cluster Server™ line of products available from VERITAS Software Corporation (now owned by Symantec Corp.) may be used, although other software from other vendors exist. The cluster server software generally monitors operation of the computers in the cluster (often referred to as "nodes"), and may "fail over" an application server from one node to another to maintain high availability. Fail over may occur due to a failure (software or hardware) detected on the node being failed away from, or may occur to more even balance application load with then cluster.

Generally, application servers that execute on the cluster include one or more shared resources that need to be available to each node in the cluster in order for a given node to execute the application server. The shared resources may include files stored on a shared storage medium, as well as properties of the application server (e.g. an Internet protocol (IP) address assigned to the application server and used by clients to contact the application server, other Transport Control Protocol (TCP)/IP settings, etc.). In contrast, local resources may be resources on a particular node (e.g. files on the node, node properties, etc.).

Another aspect of ensuring high availability is to regularly backup the computer data, to avoid data loss in the event of a significant failure. For example, hardware or software failures may corrupt application data, requiring a backup copy to stem the loss of data. A power failure may bring down the whole cluster, preventing a fail over to keep the application server available. Other failures in the environment (e.g. natural disasters, attack, etc.) may require relocating the application server to an alternate site that is physically distant from the cluster (often termed a "disaster recovery" site). Typically, each node in the cluster is backed up and the application servers are also backed up. Restoring generally includes restoring each failed node in the cluster, reactivating the cluster, and then restoring the application servers onto the cluster. Part of restoring a node includes inhibiting a restore of the shared data for an application server that was on the node at the time of backup, in case the application server failed over to another (non-failing) node and is still executing.

Oftentimes, when a disaster occurs and relocation to the disaster recover site is needed, it is sufficient merely to get the application server running again. It may not be desirable to have a cluster at the disaster recovery site, either for cost reasons or to reduce complication at the disaster recovery site. However, since the backups were made from the cluster, it is not easy to restore the application server in a non-clustered environment and get it up and running. Typically, a great deal of manual work by a highly knowledgeable administrator is needed, lengthening recovery time and making the recover process error prone. Furthermore, if an application server was previously highly available but the costs of the cluster now outweigh the benefits, again there is no easy mechanism to consolidate the application server onto a single computer.

SUMMARY

In one embodiment, a backup/restore mechanism is contemplated which may be used to consolidate application servers from a cluster to a single node and/or to restore a clustered environment. The mechanism may automatically consolidate shared resources on a node during a restore, even if the resources were external to the nodes in the cluster (e.g. on a shared storage device). Thus, complex and error prone manual intervention may be avoided, in some embodiments.

In some embodiments, the backup mechanism may include checking identifiers for each node and application server in a cluster server data base, to identify node backups as opposed to application server backups. Local node resources may be associated with the node backups, and shared resources may be associated with the application server backups. Additionally, in some embodiments, cluster server software and/or settings may be disabled as part of the restore. Thus, the application server may execute without clustering on the single node. In still other embodiments, the cluster server software and/or settings may not even be restored to the node.

In one embodiment, a computer readable medium stores a plurality of instructions which, when executed: restore a first backup image to a computer, and cause a restore of a second backup image to the computer as well. The first backup image comprises local resources of a first node of a plurality of nodes forming a cluster on which an application server is executable at the time the first backup image is made. The second backup image comprises shared resources used by the application server, wherein at least one of the shared resources is external to the first node during execution of the application server on the cluster.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Broadly, the system, method, and software described herein is configured to backup application servers and the underlying computer nodes during operation as a cluster, and to optionally cause restoring of an application server to a single node, rather than a cluster. For example, the restore to a single node may be used when it is determined that the application server no longer needs to be highly available. The application server may be backed up from the cluster and restored to a single machine, and the server performing the restore may handle the consolidation of the application server to the single node automatically. Additionally, cluster server software and/or settings may be disabled so that the application server executes on the single node without clustering. In other embodiments, the cluster server software and settings may not be restored to the single node at all. The restore to a single node may also be used if relocation from a primary site having a cluster to a disaster recover site that does not have a cluster. The restore to a single node may be used even if not relocating, e.g. if restoring the cluster is not desired so that the application server is back on line and available as soon as possible, even with possible lowered availability and/or performance.

Backup Environment Example

Figure 1:
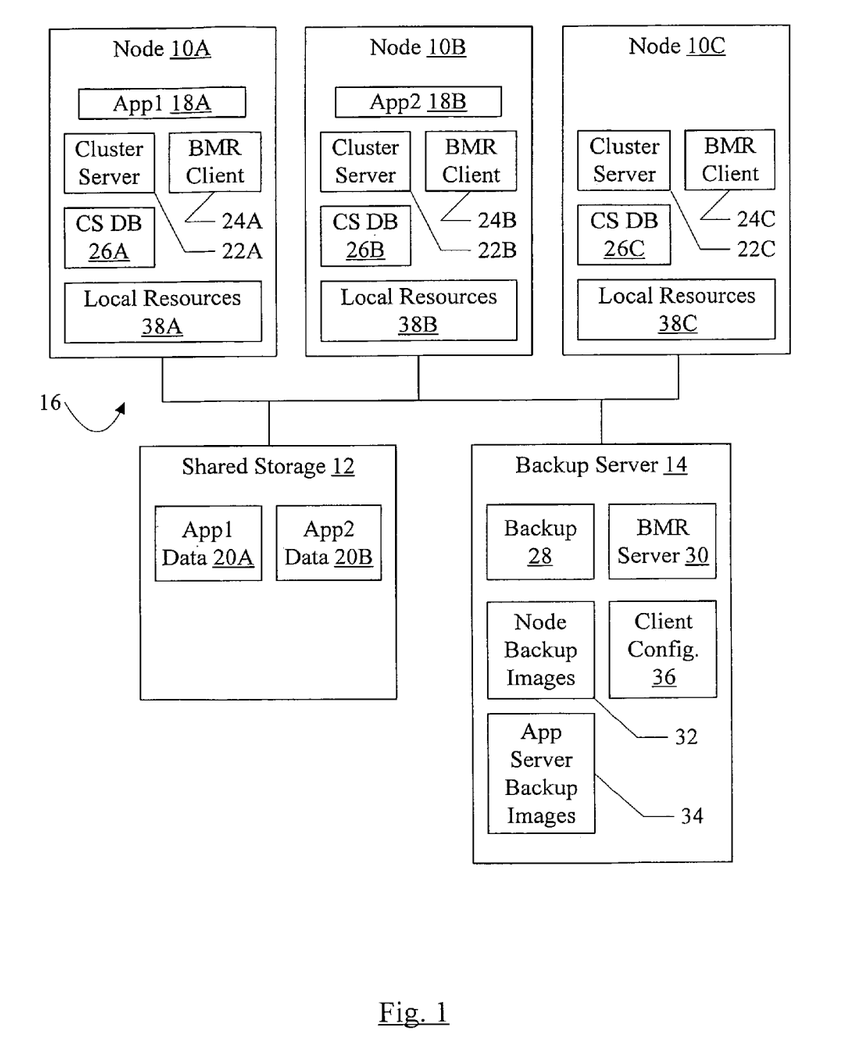
FIG. 1 is a block diagram of one embodiment of a cluster.

Turning now to FIG. 1, a block diagram is shown of one embodiment of a system comprising a plurality of nodes 10A-10C forming a cluster, a shared storage device 12, and a backup server 14. The nodes 10A-10C, the shared storage device 12, and the backup server 14 are coupled via a network 16. In the illustrated embodiment, two application servers (App1 18A and App2 18B) are executable on the cluster. Each application server (or more briefly, application) may have various shared resources (e.g. a shared IP address and shared data stored on the shared storage device 12, such as App1 data 20A corresponding to App1 18A and App2 data 20B corresponding to App2 18B). Each node 10A-10C includes an instance of the cluster server software 22A-22C, which work together to monitor application server execution and to fail over application servers to other nodes 10A-10C. The cluster server software 22A-22C may use the cluster server databases (CS DB) 26A-26C Bare metal restore (BMR) client software 24A-24C is also shown on each node 10A-10C. The backup server 14 may include backup software 28, BMR server software 30, node backup images 32, app server backup images 34, and client configuration files 36. Each respective node 10A-10C may also include local resources 38A-38C.

Each of the nodes 10A-10C may comprise a computer configured to execute software (such as the application severs 18A-18B, the cluster server software 22A-22C, and the BMR client software 24A-24C shown in FIG. 1). The nodes 10A-10C may also be configured to communicate on the network 16 with the backup server 14 and the shared storage device 12. The backup server 14 may similarly be a computer configured to execute the backup software 28 and the BMR server software 30, or may be more than one computer in some embodiments.

The shared storage device 12 may comprise any one or more computer accessible media (e.g. disk drives) that are configured to be accessed over the network 16. There may be more than one shared storage device, in various embodiments. By storing shared data 20A-20B for the application servers 18A-18B on the shared storage device 12, the data may be available immediately to the application server 18A or 18B if it is failed over to another node (e.g. the node 10C). Thus, the data need not be failed over as part of the application state. Other shared resources, such as the shared IP address assigned to the application server 18A-18B, may be failed over from one node to the other (or may be available in the shared data 20A-20B, if desired). In various embodiments, the shared storage device 12 may comprise network attached storage (NAS), storage area network (SAN), and/or one or more file servers.

The network 16 may comprise any communication media and protocol capable of linking computers and/or network storage devices together. For example, the network may comprise a local area network (LAN) such as Ethernet, token ring, fibre channel, etc. The network may comprise a wide area network (WAN), the Internet, or any other type of network or combination of networks. The communication media may comprise electrical wiring (e.g. twisted pair), optical fiber, wireless communication, etc.

The cluster server software 22A-22C may be designed to manage a cluster and to provide for failover of an application server(s) executing in the cluster. For example, the cluster server may provide for checkpointing an application's state so that, if a failover occurs, the application server may begin executing at the checkpoint. Alternatively, the application server may be started from a default initial state without using a checkpoint, if desired, or using an application's internal checkpointing functionality, if the application server includes such functionality. Additionally, the cluster server may perform the failover of the application server to another node in the cluster. As used herein, the term "failover" refers to resuming execution of an application server on another node than a previous node on which the application server was executing. If the application server is still executing on the previous node when a failover occurs, the execution may be terminated on the previous node as part of the failover. In one implementation, the cluster server may be the VERITAS Cluster Server™ product available from VERITAS Software Corporation (Mountain View, Calif.). Any cluster server from any vendor may be used, however.

The cluster server software 22A-22C may use the CS DBs 26A-26C to track the resource dependencies of each application server 18A-18B, to determine when a failover may occur. The resource dependencies may include both local resources (e.g. specific hardware or software on the node 10A-10C on which the application server is executing) and shared resources (e.g. shared data 20A-20B, shared IP address, other TCP/IP settings, etc.). In one embodiment, resources are arranged into resource groups that correspond to each application. The group may include the volumes used by the application server, the shared IP address for the application server, the start and stop commands for the application, etc. In other embodiments, the CS DB may be stored on the shared storage device 12 to be accessible to the cluster servers 22A-22C on each node 10A-10C.

The backup server 14 may backup the cluster. In one embodiment, backing up the cluster may include backing up each node 10A-10C and the application servers 18A-18B that are executing on the cluster. When each node is backed up, the local resources 38A-38C of that node are included in the backup but resources external to the node (e.g. the shared storage device 12) are not backed up. When each application server 18A-18B is backed up, the shared data on the shared storage device 12 that corresponds to the application server is backed up but the local resources are not backed up.

In the illustrated embodiment, the backups are made to backup images. Specifically, the backup images corresponding to the nodes 10A-10C (and comprising the local resources in those nodes 10A-10C) are illustrated as the node backup images 32, and the backup images corresponding to the application servers 18A-18B are shown as the app server backup images 34. The backup images are created by the backup software 28, which may implement any backup solution (e.g. the VERITAS NetBackup™ product from VERITAS Software Corporation, or any other VERITAS backup product or backup product from any other vendor). The backup images 32 and 34 may be the most recent backup image of the nodes 10A-10C and application servers 18A-18B. Other, preceding backup images may also be retained on the backup server 14 or other storage.

As used herein, the term "image" may refer to any copy of the data from a computer (e.g. files, including both data files and files containing software instructions to be executed on the computer system) or application server, which is treated as a "virtual" server for backup purposes in this embodiment. A backup image may be an image made as a backup of the data on the computer system. Other images may be created due to replication (e.g. volume or file replication), snapshot images used with provisioning software as an image to install on other computer systems, etc. In some cases, the image may comprise the set of files from the corresponding client stored in the same directory structure that the client uses, relative to a directory on the backup server 14 designated as the "root" (e.g. a directory on the backup server 16 may correspond to the root on the client system). Alternatively, the set of files may be stored in any desired fashion on the backup server, and the location of each file in the client's directory structure may also be recorded. In other embodiments, an image may comprise a block-by-block copy of the data from the storage devices in the client.

At the time the backup is performed, a record is made of the system configuration. The record is illustrated as the client configuration files 36 on the backup server 14 in FIG. 1, although the record may be stored in any form. In some embodiments, the client configuration file 36 may be part of the backup image as well, or the client configuration file 36 may be stored only as part of the backup image and may be retrieved by the BMR server software 30 when a restore is to be performed. The record may be created by the BMR software (e.g. either the BMR client software 24A-24C executing on the nodes 10A-10C, or by the BMR server software 30). A client configuration file 36 may be created for each node 10A-10C and each application server 18A-18B.

The client configuration file 36 may store various information describing the computer configuration. For example, the computer configuration may include the number, type, and size of storage devices in the computer. The computer configuration may further include an identification of the volumes on the storage devices, including the layout of volumes on the storage devices and the attributes of the volumes. Other computer configuration data may include the number and type of processors, the amount of memory, and information on other peripheral devices such as network interface hardware, printer hardware, user interface devices, etc.

The client configuration files 36 and the backup images 32 and 34 may be used to restore the nodes after a failure or other data loss. The restore may be a "bare metal" restore. That is, at the beginning of the restore operation, the client may have no software installed on it.

In the illustrated embodiment, the backup server 14 stores the backup images 32 and 34 and the client configuration files 36. In other embodiments, one or more of the preceding may be stored on the shared storage device 12 or another device. It is noted that, while the cluster illustrated in FIG. 1 includes 3 nodes, other clusters may include two nodes or more than three nodes, as desired. Similarly, various embodiments may host one application server, or more than two application servers, on a cluster. It is further noted that, while the backup software 28 and the BMR server software 30 are shown separately in FIG. 1, these modules may be integrated, in some embodiments.

Figure 2:
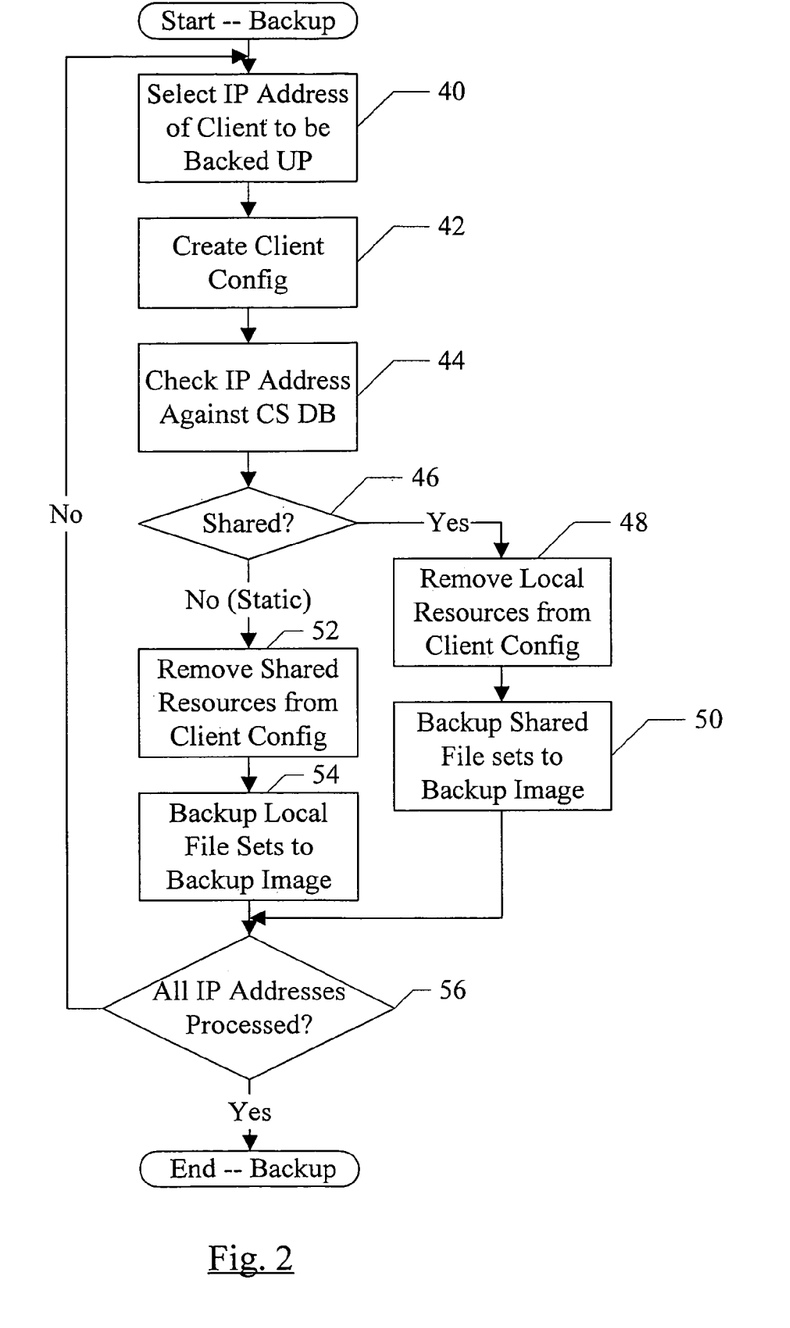
FIG. 2 is a flowchart illustrating one embodiment of backup in the cluster.

Turning now to FIG. 2, a flowchart is shown illustrating operation of one embodiment of the backup software 28 and the BMR server software 30 to backup a cluster. While the blocks are shown in a particular order for ease of understanding, other orders may be used. Furthermore, the operations may be parallelized, if desired. The backup software 28 and the BMR server software 30 may comprise instructions which, when executed, implement the operation described with regard to FIG. 2. Furthermore, while the illustrated embodiment assigns certain operation to certain software, any one or more software modules may be used to implement the illustrated operation.

In the illustrated embodiment, the backup software 28 may create backups according to IP address. In other embodiments, a name may be assigned to each entity to be backed up, and the name may be associated with the entity. The backup software 28 may have a list of the IP addresses to backup, or may have defined backup jobs to execute that each may include one or more IP addresses to backup. The backup software 28 may select the IP address of the client (node or application server) to be backed-up (block 40). The BMR client software 24A-24C on the node may create a client configuration file 36 for the client (block 42), and may send the client configuration file 36 to the backup server 14. The BMR client software 24A-24C may also check the selected IP address against the CS DB 26A-26C on the node 10A-10C to determine if the selected IP address is shared (an application server's assigned IP address) or static (a node's IP address) (block 44).

If the IP address is located in the CS DB 26A-26C (and thus is a shared IP address assigned to an application server-decision block 46, "yes" leg), the BMR server software 30 may remove the local resources from the client configuration file 36. If the application server is later restored to a given node, the local resources of the given node may be used instead (block 48). Additionally, the backup software 28 may backup the shared file sets from the shared storage device 12 that correspond to the application server, creating an application server backup image 34 (block 50).

If the IP address is not located in the CS DB 26A-26C (and thus is a static IP address assigned to a node-decision block 46, "no" leg), the BMR server software 30 may remove the shared resources from the client configuration file 36 (block 52). Additionally, the backup software 28 may backup the local file sets from the node, creating a node backup image 32 (block 54).

If all IP addresses in the cluster have not been processed (decision block 56, "no" leg), the backup software 28 may select the next IP address and blocks 40-56 may be repeated. If all IP address have been processed (decision block 56, "yes" leg), the backup operation is complete.

Restore Environment Example

Figure 3:
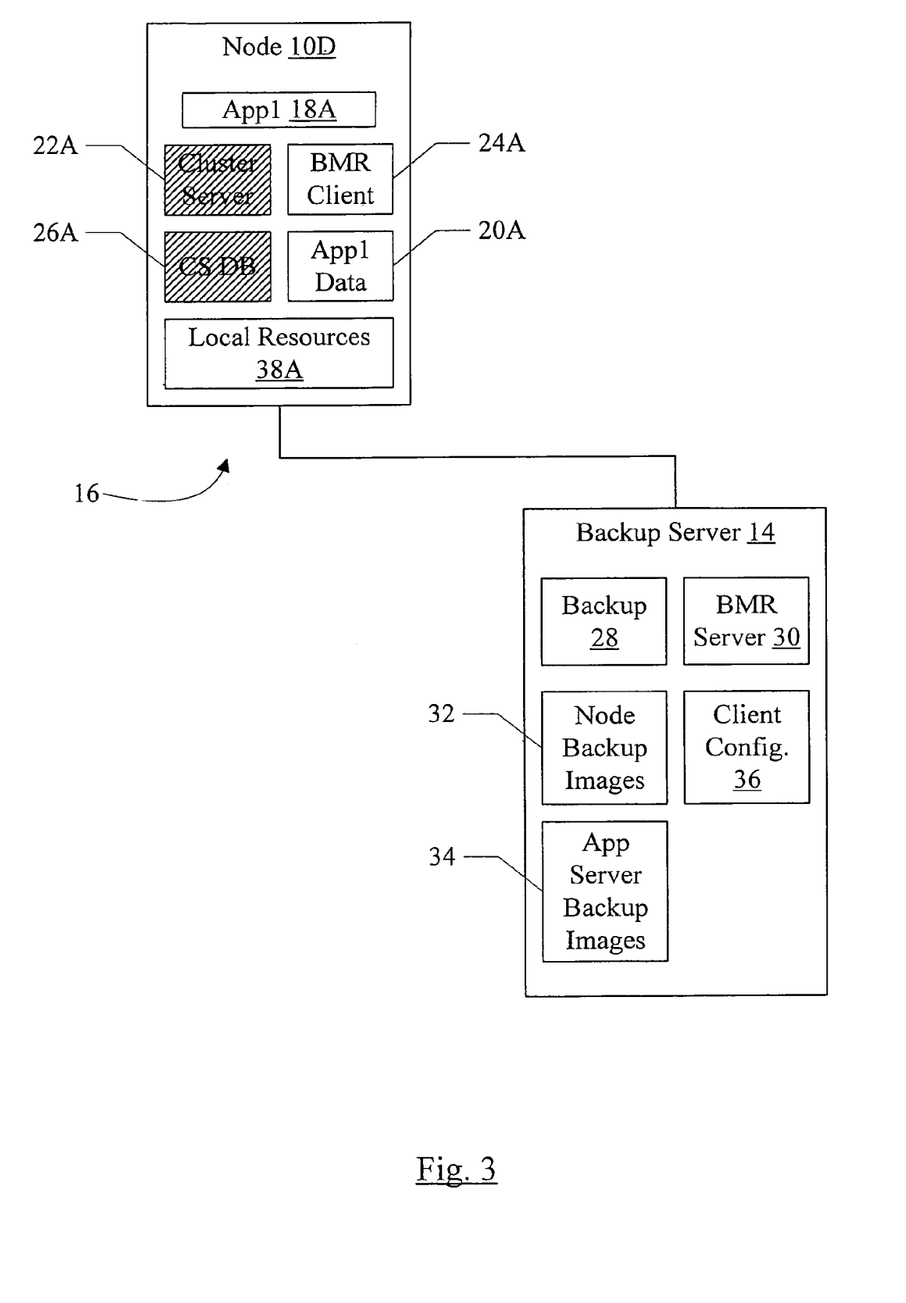
FIG. 3 is a block diagram of one embodiment of restoring a backup.

Turning now to FIG. 3; a block diagram is shown of one embodiment of a system for restoring a computer (node) 10D, including an application server that was previously executing on a cluster. The backup server 14 is shown in FIG. 3, and includes the backup software 28, the BMR server software 30, the node backup images 32, the client configuration files 36, and the app server backup images 34. The backup server 14 is coupled via the network 16 to the node 10D. The node 10D may be one of the nodes 10A-10C, a replacement for one of the nodes 10A-10C, or a node physically located elsewhere (e.g. a disaster recover site) in various embodiments. Before the restore is performed, the node 10D may include essentially no software (it may be "Bare Metal"). After the restore operation is completed, the node 10D includes the application server 18A, the BMR client software 24A, the shared application data 20A corresponding to the application server 18A, and the local resources 38A. The node 10D also includes the cluster server 22A and the CS DB 26A (because these are in the node backup image), but the cluster server 22A is disabled in this embodiment (illustrated by crosshatching in FIG. 3). Thus the application server 18A has been consolidated (at least temporarily) to the node 10D.

When the node 10D is selected for a restore, the user (e.g. an administrator) may be given an option to consolidate one or more application servers on the node. Alternatively, a script or other configuration file may be created that indicates which application servers, if any, are to be restored on the nodes, or the backup server 14 may be configured to automatically select application server(s) to be restored on a node (e.g. based on policies selected by the user). As used herein, the term "restore" may include preparing a node to store an image, copying the image to the node, and booting the node as the restored node.

In one embodiment, the restore process may include installing a repair environment on the node 10D, including an operating system and the BMR client software 24A, using the repair environment to copy the image to the node 10D (e.g. in a separate restored client environment), possibly modifying the configuration of the restored client environment (e.g. disabling the cluster server), deleting the repair environment, and rebooting to the restored client environment. In some embodiments (e.g. Unix-like environments), the repair environment may exist only in memory. That is, no install of the repair environment to stable storage and reboot into the repair environment may be needed, as a network boot may be supported to directly boot the node 10D over the network 16.

In some embodiments, a file server and/or boot server may also be provided to serve certain data to the node 10D (not shown in FIG. 3). For example, the file server may provide various software used during the restore process, which may include the operating system software, BMR client software, backup client software, etc. The boot server may be used to provide a boot image to node 10D. When the node 10D is booted to perform a restore, the node 10D may use standard network boot protocols to boot using the boot image. In some embodiments, a media boot is supported in which the boot image and software from the file server are stored on a computer accessible medium such as a compact disk (CD) or digital video disk (DVD), and the disk is used to boot the node 10D.

Figure 4:
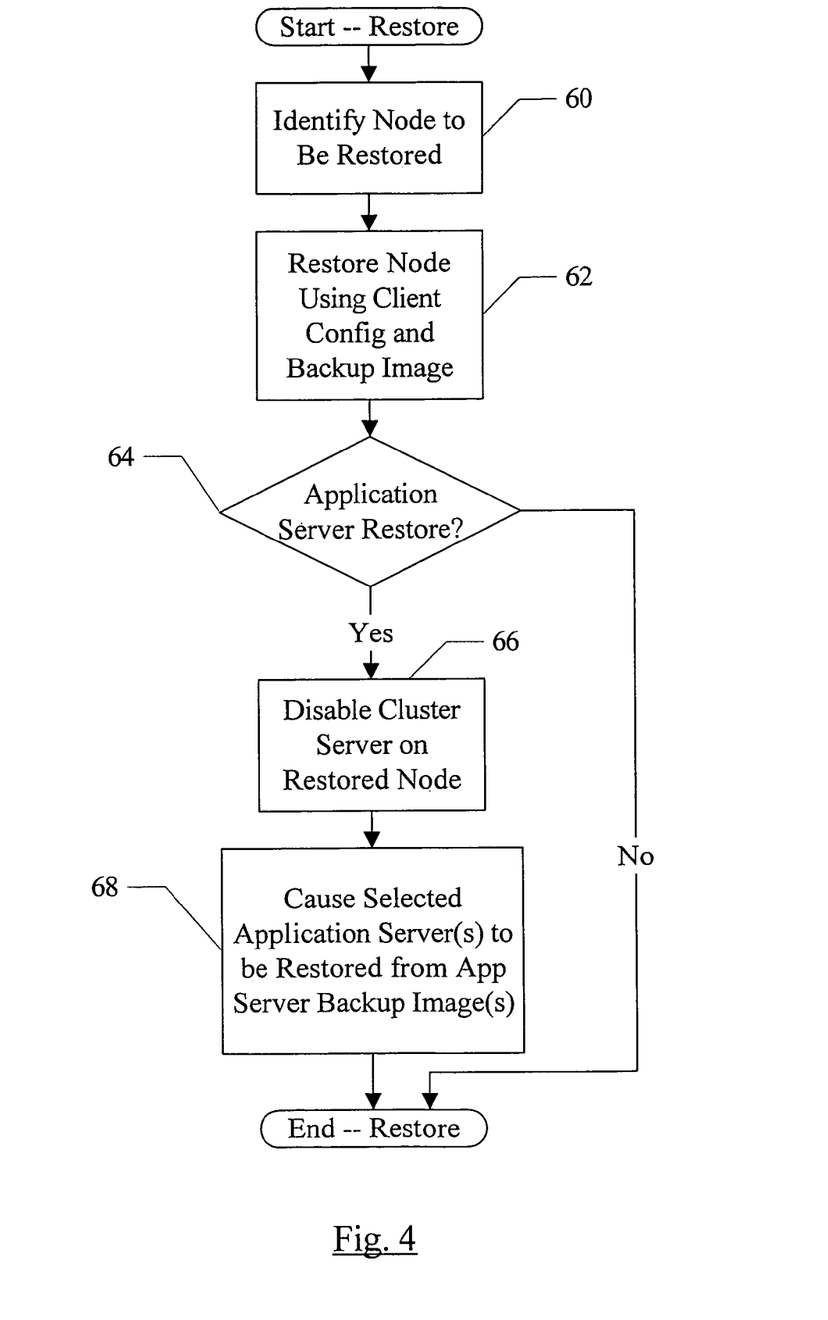
FIG. 4 is a flowchart illustrating one embodiment of restore in the cluster.

Turning now to FIG. 4, a flowchart is shown illustrating operation of one embodiment of the backup software 28 and the BMR server software 30 to restore a node including an application server that was backed-up from a cluster. While the blocks are shown in a particular order for ease of understanding, other orders may be used. Furthermore, the operations may be parallelized, if desired. The backup software 28 and the BMR server software 30 may comprise instructions which, when executed, implement the operation described with regard to FIG. 4. Furthermore, while the illustrated embodiment assigns certain operation to certain software, any one or more software modules may be used to implement the illustrated operation.

The BMR server software 30 and the backup software 28 may identify the node to be restored (e.g. via direct or indirect user input of an IP address or name), selecting the node backup image 32 and the client configuration file 36 corresponding to the identified node (block 60). The backup software 28 and the BMR server software 30 may cooperate to restore the node using the client configuration file 36 and the node backup image 32 (block 62). If at least one application server is to be restored (decision block 64, "yes" leg), the BMR server software 30 may disable the cluster server on the node 10D (block 66) and may cause the selected application server(s) to be restored to the node 10D from their respective app server backup images 34 (block 68). That is, the shared resources in the app server backup image 34 for the application server may be restored to the node 10D (e.g. the app1 data 20A illustrated in FIG. 3). Thus, the restore may conditionally restore one or more application servers from their backup images, including shared resources that were previously external to the nodes in the cluster.

In various embodiments, the BMR server software 30 may cause the restore of the application server from the app server backup image 34 in a variety of fashions. For example, the BMR server software 30 may directly restore the app server backup image 34. Alternatively, the BMR server software 30 may configure the node to request the application server (e.g. by shared IP address) after the node boots. In yet another example, the BMR server software 30 may install a configuration file on the node that indicates that it has permission to restore the application server. Generally, causing the restore may refer to indirectly or directly restoring the backup image 34.

It is noted that that present description refers to instructions forming software and being executed on a computer. The instructions may be machine instructions directly executed by the processor hardware in the computer, or may be higher level instructions that are either interpreted by the computer (e.g. shell scripts, Java programs, etc.) or compiled to machine instructions (e.g. high-level languages such as C, C++, etc.).

It is further noted that, while the present embodiment uses a bare metal backup/restore solution, other embodiments may use a conventional backup/restore in which the operating system and backup software are manually installed on a node to be recovered, and then the backup image restoration is launched via the backup software.

Server Consolidation

Figure 5:
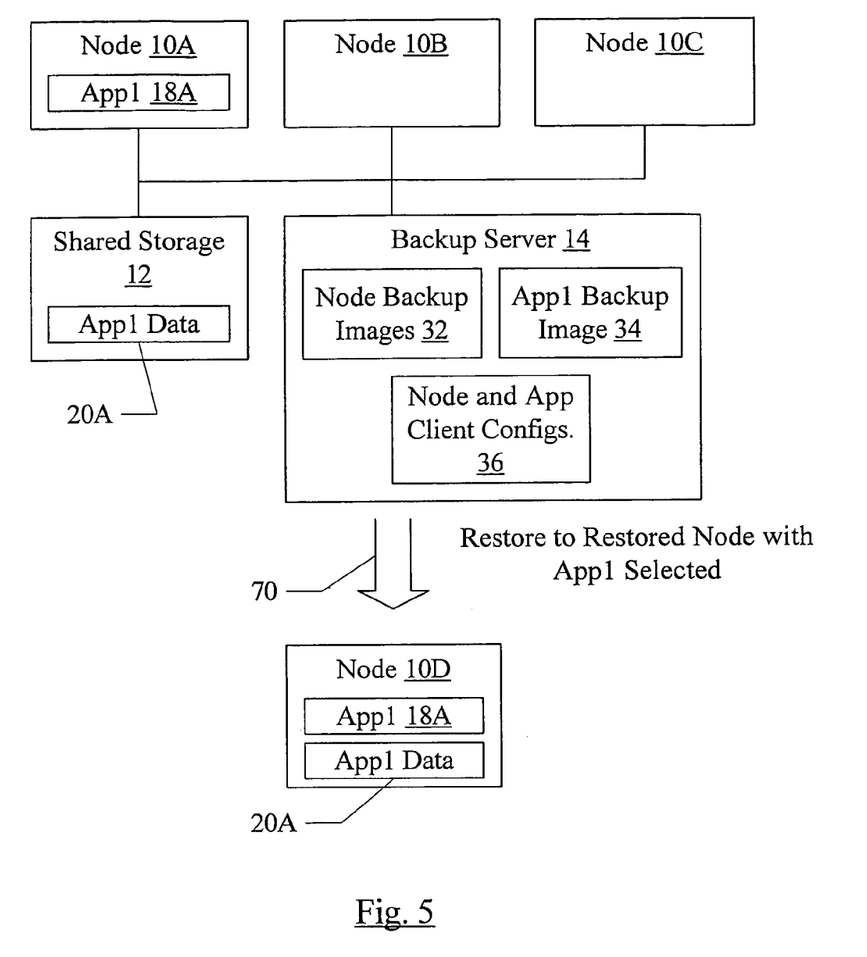
FIG. 5 is a block diagram illustrating an example of server consolidation.

FIG. 5 is an example of the use of the backup/restore mechanism to consolidate the application server 18A to a single node. The nodes 10A-10C are shown, with the application server 18A executing on the node 10A and the shared data 20A for the application server 18A on the shared storage 12. The backup server 14 has node backup images 32 (including at least a backup image corresponding to the node 10A), the app1 backup image 34 corresponding to the application server 18A (which includes the shared data 20A), and the node and application server client configuration files 36.

The backup server 14 may restore the node with the application server on the node 10D (arrow 70), using the node backup image 32 for the node 10A, the app1 backup image 34, and the node and app server client configuration files 36. The result is the node 10D with the application server 18A and its shared data 20A on the node 10D. Thus, through the backup and restore process, the application server 18A has automatically been consolidated to the node 10D.

Restore to Disaster Recovery Site

Figure 6:
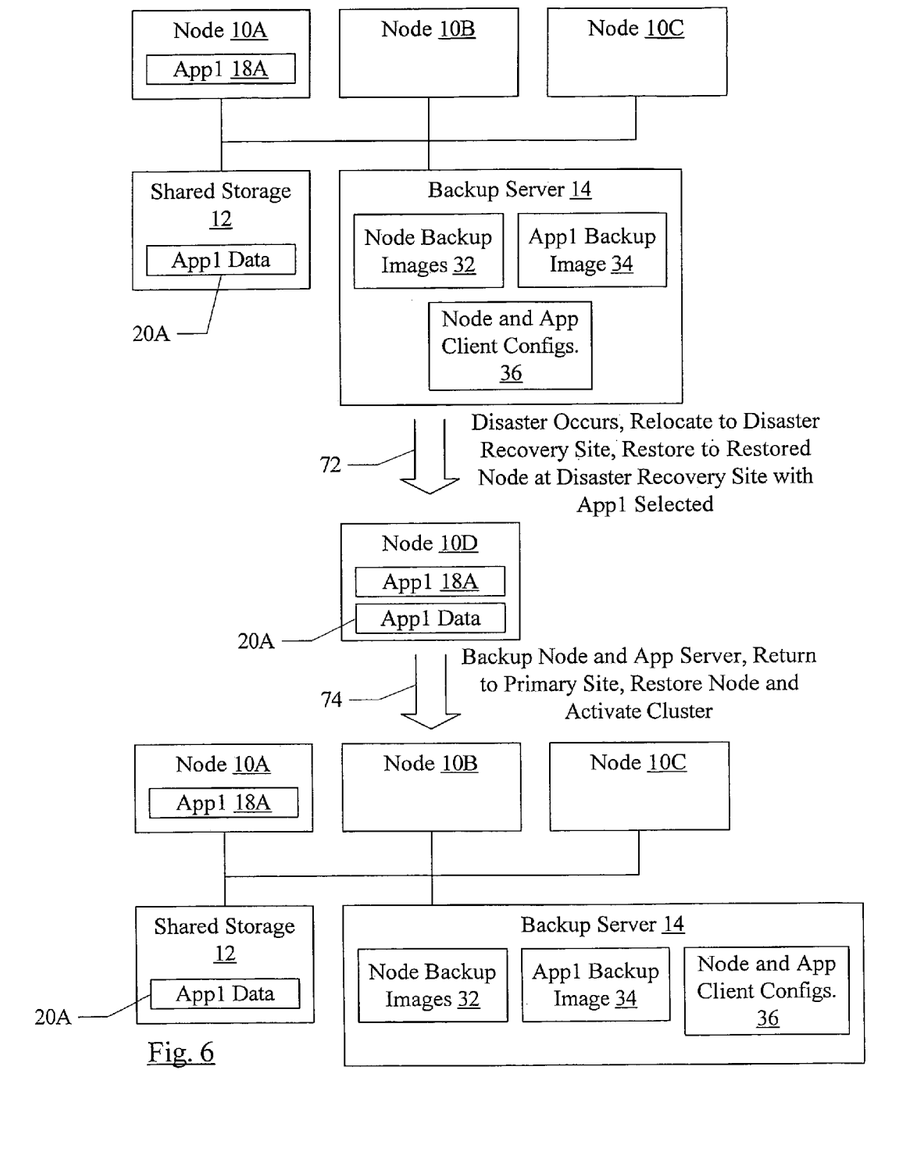
FIG. 6 is a block diagram illustrating an example of disaster recovery.

FIG. 6 illustrates an example in which the backup/restore mechanism is used to backup a cluster at a primary site, restore to a single node at a disaster recovery site, and later return to the primary site and its cluster. A similar example may be used even if not moving to a disaster recovery site, to rapidly recover the application server without having had to restore the entire cluster.

Similar to the example of FIG. 5, the application server 18A is initially executing on a cluster comprising the nodes 10A-10C, with backup images 32 and 34 and client configuration files 36 on the backup server 14. The backup server 14 may restore the node 10A, with the application server 18A selected, at the disaster recovery site. The result is again the node 10D with the application server 18A and its shared data 20A executing on the node 10D rather than a cluster.

Subsequently, the decision to return to the primary site may be made. The node 10D and the application server 18A may be backed up, and a return to the primary site may be performed (arrow 74). The application server may be restored to the cluster. The restore may be effected in various fashions. For example, the node 10A may be restored similar to the node 10D. The nodes 10B-10C may be restored, and then the cluster server software may be activated on each node 10A-10C. Each node may join the cluster for the application server 18A, which may include moving the shared data 20A back to the shared storage 12. The state of the cluster would be all application servers (e.g. the application server 18A) failed over to the node 10A. Alternatively, the restore may be performed to a cluster. In such an embodiment, the cluster server software is activated as part of the restore process, and the nodes 10A-10C may be booted after all nodes are restored, thus forming a cluster. The shared application data 20A may be restored to the shared storage device 12 in such an embodiment.

Computer Accessible Medium and Computer

Figure 7:
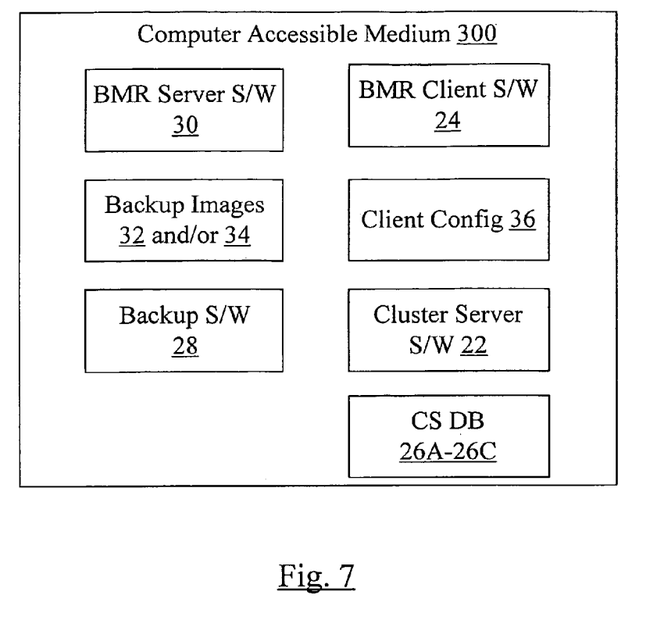
FIG. 7 is a block diagram of one embodiment of a computer accessible medium.

Turning now to FIG. 7, a block diagram of a computer accessible medium 300 is shown. Generally speaking, a computer accessible medium may include any media accessible by a computer during use to provide instructions and/or data to the computer. For example, a computer accessible medium may include storage media. Storage media may include as magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link. The computer accessible medium 300 in FIG. 7 may store one or more of the BMR server software 30, the BMR client software 24 (an instance of the BMR client software 24A-24C), one or more backup images 32 and/or 34, one or more client configuration files 36, cluster server software 22 (an instance of the cluster server software 22A-22C), backup software 28, and one or more CS DBs 26A-26C. The various software may comprise instructions which, when executed, implement the operation described herein for the respective software. Generally, the computer accessible medium 300 may store any set of instructions which, when executed, implement a portion or all of the flowcharts shown in one or more of FIGS. 2 and 4.

Figure 8:
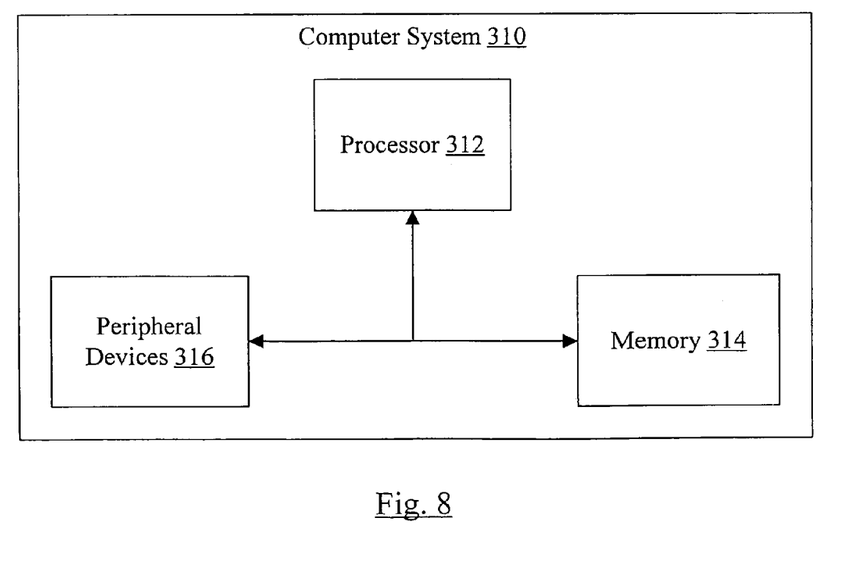
FIG. 8 is a block diagram of one embodiment of a computer.

FIG. 9 is a block diagram of one embodiment of an exemplary computer system 310. In the embodiment of FIG. 9 the computer system 310 includes a processor 312, a memory 314, and various peripheral devices 316. The processor 312 is coupled to the memory 314 and the peripheral devices 316.

The processor 312 is configured to execute instructions, including the instructions in the software described herein, in some embodiments. In various embodiments, the processor 312 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 310 may include more than one processor.

The processor 312 may be coupled to the memory 314 and the peripheral devices 316 in any desired fashion. For example, in some embodiments, the processor 312 may be coupled to the memory 314 and/or the peripheral devices 316 via various interconnect. Alternatively or in addition, one or more bridge chips may be used to couple the processor 312, the memory 314, and the peripheral devices 316, creating multiple connections between these components.

The memory 314 may comprise any type of memory system. For example, the memory 314 may comprise DRAM, and more particularly double data rate (DDR) SDRAM, RDRAM, etc. A memory controller may be included to interface to the memory 314, and/or the processor 312 may include a memory controller. The memory 314 may store the instructions to be executed by the processor 312 during use (including the instructions implementing the software described herein), data to be operated upon by the processor 312 during use, etc.

Peripheral devices 316 may represent any sort of hardware devices that may be included in the computer system 310 or coupled thereto (e.g. storage devices, optionally including a computer accessible medium 300, other input/output (I/O) devices such as video hardware, audio hardware, user interface devices, networking hardware, etc.). In some embodiments, multiple computer systems may be used in a cluster.

In some embodiments, the nodes 10A-10D and the backup server 14 may be implemented as instantiations of the computer system 310.

Numerous variations and modifications will become apparent to those skilled in the art once the above disclosure is fully appreciated. It is intended that the following claims be interpreted to embrace all such variations and modifications.

What is claimed is:

1. A computer-implemented method comprising:
a server restoring a first backup image to a computer, wherein the first backup image comprises local resources of a first node of a plurality of nodes forming a cluster on which an application server is executable at the time the first backup image is made; and
the server causing a restore of a second backup image to the computer in addition to the first backup image, wherein the second backup image comprises shared resources used by the application server, wherein at least one of the shared resources is external to the first node during execution of the application server on the cluster, and wherein the at least one of the shared resources is internal to the first node subsequent to the restore of the second backup image.

2. The method as recited in claim 1 further comprising disabling cluster server software on the computer, whereby the application server is no longer executing on the cluster.

3. The method as recited in claim 2 further comprising:
   restoring one or more other nodes of the plurality of nodes to other computers;
   enabling the cluster server software; and
   the computer and the other computers joining the cluster.

4. The method as recited in claim 1 wherein causing the restore comprises configuring the computer to request the second backup image.

5. The method as recited in claim 1 wherein causing the restore comprises creating a configuration file on the computer that indicates that the computer has permission to restore the application server.

6. The method as recited in claim 1 wherein causing the restore comprises the server directly restoring the second backup image.

7. The method as recited in claim 1 wherein causing the restore is responsive to user input selecting the application server to be restored with the node.

8. A computer-implemented method comprising:
   a server restoring a first backup image to a computer, wherein the first backup image comprises local resources of a first node of a plurality of nodes forming a cluster on which an application server is executable at the time the first backup image is made;
   the server causing a restore of a second backup image to the computer, wherein the second backup image comprises shared resources used by the application server, wherein at least one of the shared resources is external to the first node during execution of the application server on the cluster;
   backing up the first node to create the first backup image;
   backing up the application server to create the second backup image; and
   checking a first identifier for the first node and a second identifier for the application server in a cluster server database to identify the first backup image as a node backup and the second backup image as an application server backup.

9. The method as recited in claim 8 further comprising removing local resources responsive to identifying the second backup image as an application server backup.

10. The method as recited in claim 9 further comprising removing shared resources responsive to identifying the first backup image as a node backup.

11. The method as recited in claim 8 further comprising removing shared resources responsive to identifying the first backup image as a node backup.

12. The method as recited in claim 8 wherein the identifier comprises an Internet protocol (IP) address.

13. A computer readable medium storing a plurality of instructions which, when executed:
   restore a first backup image to a computer, wherein the first backup image comprises local resources of a first node of a plurality of nodes forming a cluster on which an application server is executable at the time the first backup image is made; and
   cause a restore of a second backup image to the computer in addition to the first backup image, wherein the second backup image comprises shared resources used by the application server, wherein at least one of the shared resources is external to the first node during execution of the application server on the cluster, and wherein the at least one of the shared resources is internal to the first node subsequent to the restore of the second backup image.

14. The computer readable medium as recited in claim 13 wherein the plurality of instructions, when executed, disable cluster server software on the computer, whereby the application server is no longer executing on the cluster.

15. The computer readable medium as recited in claim 13 wherein the plurality of instructions, when executed:
   back up the first node to create the first backup image;
   back up the application server to create the second backup image; and
   check a first identifier for the first node and a second identifier for the application server in a cluster server database to identify the first backup image as a node backup and the second backup image as an application server backup.

16. The computer readable medium as recited in claim 15 wherein the plurality of instructions, when executed, remove local resources responsive to identifying the second backup image as an application server backup.

17. The computer readable medium as recited in claim 15 wherein the plurality of instructions, when executed, remove shared resources responsive to identifying the first backup image as a node backup.

18. The computer readable medium as recited in claim 13 wherein causing the restore comprises configuring the computer to request the second backup image.

19. The computer readable medium as recited in claim 13 wherein causing the restore comprises creating a configuration file on the computer that indicates that the computer has permission to restore the application server.

20. The computer readable medium as recited in claim 13 wherein causing the restore comprises the server directly restoring the second backup image.

21. A system comprising:
   a computer; and
   a server configured to restore a first backup image to a computer, wherein the first backup image comprises local resources of a first node of a plurality of nodes forming a cluster on which an application server is executable at the time the first backup image is made; and cause a restore of a second backup image to the computer in addition to the first backup image, wherein the second backup image comprises shared resources used by the application server, wherein at least one of the shared resources is external to the first node during execution of the application server on the cluster, and wherein the at least one of the shared resources is internal to the first node subsequent to the restore of the second backup image.

22. The system as recited in claim 21 wherein the server is further configured to disable cluster server software on the computer, whereby the application server is no longer executing on the cluster.

23. The system as recited in claim 21 wherein the server is further configured to:
   back up the first node to create the first backup image;
   back up the application server to create the second backup image; and
   check a first identifier for the first node and a second identifier for the application server in a cluster server database to identify the first backup image as a node backup and the second backup image as an application server backup.

24. The system as recited in claim 23 wherein the server is further configured to remove local resources responsive to identifying the second backup image as an application server backup.

25. The system as recited in claim 23 wherein the server is further configured to remove shared resources responsive to identifying the first backup image as a node backup.

26. The system as recited in claim 21 wherein the server causing the restore comprises the server configuring the computer to request the second backup image.

27. The system as recited in claim 21 wherein the server causing the restore comprises the server creating a configuration file on the computer that indicates that the computer has permission to restore the application server.

* * * * *